United States Patent
Levitt et al.

(10) Patent No.: US 6,489,003 B1
(45) Date of Patent: Dec. 3, 2002

(54) ELASTIC FASTENER (75) Inventors: Leon Levitt, Mendota Heights, MN (US); Robert D. Kampfer, Oakdale, MN (US); Michael D. Delmore, Mounds View, MN (US); Stephen E. Krampe, Maplewood, MN (US); Brandon T. Berg, Woodbury, MN (US); Alan J. Sipinen, North Oaks, MN (US); Mark E. Napierala, Woodbury, MN (US); Victor P. Thalacker, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/508,207

(22) PCT Filed: Oct. 2, 1998

(86) PCT No.: PCT/US98/20858
§ 371 (c)(1),
(2), (4) Date: Mar. 8, 2000

(87) PCT Pub. No.: WO99/17631
PCT Pub. Date: Apr. 15, 1999

Related U.S. Application Data (63) Continuation-in-part of application No. 08/943,482, filed on Oct. 3, 1997, now Pat. No. 6,106,922.

(51) Int. Cl.[7] .................................................. B32B 3/06
(52) U.S. Cl. .................. 428/100; 428/99; 428/120; 428/174; 428/343; 24/442; 24/452
(58) Field of Search .................... 428/120, 99, 100, 428/174, 343; 24/442, 452

(56) References Cited

U.S. PATENT DOCUMENTS

| | | | |
|---|---|---|---|
| 3,192,589 A | 7/1965 | Pearson | 24/204 |
| 3,590,109 A | 6/1971 | Doleman et al. | 264/167 |
| 3,900,652 A | 8/1975 | Uraya et al. | 428/92 |

(List continued on next page.)

FOREIGN PATENT DOCUMENTS

| | | |
|---|---|---|
| EP | 0 233 364 | 8/1987 |
| EP | 0 575 828 | 12/1993 |
| GB | 2 305 388 | 4/1997 |
| GB | 2 315 095 | 1/1998 |
| JP | 8-187113 | 7/1996 |
| JP | 8-214917 | 8/1996 |
| WO | WO95/10202 | 4/1995 |

OTHER PUBLICATIONS

"Elastic Loop Tapes," XP–002091024, Velcro Fastening Systems, Product Information Guide, Aug., 1997.

Primary Examiner—Alexander S. Thomas
(74) Attorney, Agent, or Firm—Melanie Gover (57) ABSTRACT

An elastic web of material has a multiplicity of stems extending from at least one side of the web. The web includes a first continuous layer of elastic material having a first side and a second side and a second layer of material. The second layer of material has a first side which faces the first side of the first layer and a second side from which the stems extend. The first and second layers of material are joined together. The second layer of material can be formed of thermoplastic material or melt processable polymeric material. The first and second layers of material are melt formed. They are joined by coextrusion or lamination to form a multiple layer sheet on which a multiplicity of stems are formed on at least the second layer by a process such as embossing the stems into the heated web using a patterned roll or mold.

13 Claims, 2 Drawing Sheets

U.S. PATENT DOCUMENTS

| | | | |
|---|---|---|---|
| 4,056,593 A | 11/1977 | de Navas Albareda | 264/145 |
| 4,846,815 A | 7/1989 | Scripps | 604/391 |
| 4,872,243 A | 10/1989 | Fischer | 24/442 |
| 4,894,060 A | 1/1990 | Nestegard | 604/391 |
| 4,959,265 A | 9/1990 | Wood et al. | 428/343 |
| 5,077,870 A | 1/1992 | Melbye et al. | 24/452 |
| 5,149,573 A * | 9/1992 | Kobe et al. | 428/100 |
| 5,230,851 A | 7/1993 | Thomas | 264/145 |
| 5,256,231 A | 10/1993 | Gorman et al. | 156/178 |
| 5,260,015 A | 11/1993 | Kennedy et al. | 264/167 |
| 5,308,695 A | 5/1994 | Arakawa et al. | 428/354 |
| 5,325,569 A | 7/1994 | Goulait et al. | 24/448 |
| 5,374,262 A | 12/1994 | Keuhn, Jr. et al. | 604/391 |
| 5,393,475 A | 2/1995 | Murasaki et al. | 264/167 |
| 5,468,428 A | 11/1995 | Hanschen et al. | 264/483 |
| 5,505,747 A | 4/1996 | Chesley et al. | 51/297 |
| 5,611,122 A | 3/1997 | Torigoe et al. | 24/442 |
| 5,615,460 A | 4/1997 | Weirich et al. | 24/446 |
| 5,624,427 A | 4/1997 | Bergman et al. | 604/391 |
| 5,679,302 A | 10/1997 | Miller et al. | 264/167 |
| 5,773,374 A | 6/1998 | Wood et al. | 442/328 |
| 5,792,411 A | 8/1998 | Morris et al. | 264/400 |
| 5,800,903 A | 9/1998 | Wood et al. | 428/152 |
| 6,106,922 A * | 8/2000 | Cejka et al. | 428/120 |

* cited by examiner

ELASTIC FASTENER

CROSS REFERENCE TO RELATED APPLICATIONS

This application is a continuation-in-part of U.S. application Ser. No. 08/943,482, filed Oct. 3, 1997, issued as U.S. Pat. No. 6,106,922.

FIELD OF THE INVENTION

This invention relates to webs, such as polymeric webs, having a surface with a multiplicity of features used for fastening or joining. Such features may be stems, loops and other surface features that can mechanically interlock with features, such as fibers or protrusions, on an opposing surface.

BACKGROUND

Hook and loop fasteners, such as those currently marketed under the "Scotchmate" trademark by Minnesota Mining and Manufacturing Company, St. Paul, Minn. (3M) are a known type of mechanical fastener. One alternative to a hook is a mushroom-shaped protrusion or stem which can also be used as hermaphroditic mechanical fastener by engaging other protrusions or surface features rather than loops.

U.S. Pat. Nos. 4,056,593 and 4,959,265, disclose methods of extruding polymeric webs with upstanding stems. In the hook surface of U.S. Pat. No. 5,077,870, a single component thermoplastic resin is extruded onto a tool which has an array of cavities which, upon separation from the resin, form an array of stems. The stems then are calendered to produce a broader head (cap or mushroom head) at the top of the stem. U.S. Pat. No. 5,393,475 discloses a method of making a stemmed web with stems on both sides using two different materials.

Despite current advances in the art, there is a need for stemmed webs, such as mechanical fasteners, that have a wider variety of properties to meet more varied applications.

DISCLOSURE OF INVENTION

For purposes of this description, a stem refers to a promotion from a surface, such as a web, regardless of the shape, length, length-to-width-ratio, or other characteristics of the protrusion provided that the stem can mechanically interlock or engage with a mating surface having other features such as stems, loops or fibers. A stemmed web is a web having on at least one surface small or features such as hooks and stems.

The present invention is a web of material having a plurality of stems extending from at least one side of the web. The web includes at least a first layer of material having a first side and a second side and a second layer of material. The second layer of material has a first side which faces the first side of the first layer and a second side from which the plurality of stems protrude. The first and second layers of material may be, but need not be, joined together while one or both of the layers are molten and before the molten layer or layers have cooled.

The first layer is formed from an elastic material and the second layer of material can be formed of thermoplastic material or melt processable polymeric material. The first layer of material differs from the second layer of material and in one embodiment the material forming the first layer protrudes into and forms at least part of the stems formed on the second layer.

In other alternative embodiments, both surfaces of the web can have stems, and one or more of these stems can have caps. Additional layers of material also can be formed and joined together with the first and second layers.

The invention also includes a method of making a web of material having a plurality of stems. The method includes selecting a first elastic material for a first layer of material and selecting a second material for a second layer of material. The first and second layers of material are melt formed. The first and second layers of material are joined to form a two-layer sheet. Next, a plurality of stems are formed on at least the second layer of material.

The stems can be formed by pressing the multiple layer sheet against at least one temperature controlled surface containing an array of holes to form an array of stems. Caps can subsequently be formed on the tips of the stems by pressing the stems against a heated surface to form caps on the tips of the stems.

Alternatively, the stems can be formed by extruding multiple layers of a thermoplastic or melt processable material through a shaped die to form a multiple layer sheet having a plurality of raised ribs on at least one surface. A plurality of sharp edges is passed perpendicularly through the ribs, and the multiple layer sheet is stretched to separate each rib into a plurality of stems. The stems can be formed with a hooked shape or subsequently pressed against a heated surface to form a hook or capped stem.

The melt forming step can include simultaneously melt forming the first and second layers of material. The joining step can include: (a) joining together the first and second layers before any layer has cooled; (b) laminating the first and second layers; and/or (c) incorporating one or more reactive tie layers between the first and second layers. Melt forming can be accomplished by coextruding the first and second layers of material.

The inventive web can be stretched to surround an object or body to be fastened, secured or wrapped and relaxes to provide a constant tension that conforms to that body or object. It also exhibits substantially continuous fastening capability along its entire length. Instead of being formed from an elastic material having fastening means only at the ends of an elastic web, these continuous fastening constructions can have fastening means across or along the entire length and width of elastic web. Benefits realized from these constructions are at least two-fold: (1) such continuously-functional webs could be cut into any useful size and geometry and exhibit functionality, allowing for among other things a tape-like packaging; and (2) such continuously-functional webs would have more fastening capability per unit area.

BRIEF DESCRIPTION OF DRAWINGS

All of the figures are partial cross-sections of the inventive web material showing various embodiments of the stem and the combinations of the first and second material layers, as follows.

DETAILED DESCRIPTION

Mechanical fastener hook structures are one type of stemmed web. These fasteners have some type of hook, capable of engagement with a loop material formed, on a stem which, in turn, is formed on a web. In some applications, the hook structures and base supports are made from multiple components. In the present invention, these multiple components are formed together, such as by melt forming (such as extrusion) to enhance the performance properties of the mechanical fastener. These performance enhancements depend on the selection of materials and include: hook strength, hook and stem flexibility, durability, wear resistance, loop retention, loop engagement, softness, appearance, peel, and shear strength. Selecting materials and configurations changes the mechanical fastener properties for individual applications.

Another type of stemmed web has uncapped stem structures. The stem surface can be self mating when the surface of the stems is auto-adhering, e.g., by application of an adhesive material to one or more surfaces of the stemmed web.

Some properties that affect the performance include the thickness of the layers of material, the stem construction (whether the stems are formed of one or more materials and the relative placement of the materials if the stem is composed of more than one material), whether a single layer or multiple layers are used, the stem density (number of stems per unit area), the stem geometry (whether the stems are essentially straight, angled or have shaped hooks) and the characteristics of the second surface of the construction.

The multiple layer fastener includes at least two layers that are formed with at least one surface having an array of stems. The first layer of such fasteners will comprise an elastic material such that the construction overall will exhibit elastic character, i.e., may be elongated (by at least 5, preferably 10, more preferably 20 percent) from an initial state in at least one direction when subjected to a stress (eg. tensile stress) and substantially returns to said initial state upon the removal of the stress. The inventive web is considered to substantially return to its initial state or condition if there is some tensile set or stress relaxation which can be up to 50%, preferably less than 30%, more preferably less than 25%. The first layer may comprise any of the wide variety of known elastomeric materials including, for example, elastomers such as natural or synthetic rubber, styrene block copolymers containing isoprene, butadiene, or ethylene(butylene) blocks, metallocene-catalyzed polyolefins, polyurethanes or polydiorganosiloxanes. Other elastomers can be related to the following groups: polyesters, polyamides, polyolefins, block and star polymers.

The second layer of the stemmed web constructions may be initially continuous. It and other additional layers, when present, can be the same or can each be different from one another and from the material comprising the first elastic layer. For example any such second or additional layer may comprise the same or different elastomeric material comprising the first layer, or any such layer may be non-elastomeric. One such layer also may be ductile and another may be stiff. Some examples of material types useful for the second and/or the optional additional layers include polyolefins such as polypropylene or polyethylene; other thermoplastics such as polystyrene, polycarbonate, polymethyl methacrylate, ethylene vinyl acetate copolymers, acrylate modified ethylene vinyl acetate polymers, and ethylene acrylic acid copolymers; pressure-sensitive adhesives such as acrylic, natural or synthetic rubber, tackified styrene block copolymers, tackified polydiorganosiloxane urea copolymer and amorphous poly(1-alkene); hot melt adhesives such as ethylene-vinylacetate; ductile thermoplastics such as nylon or polyvinylchloride; non-tacky adhesives; as well as blends of the materials.

Multiple layers, such as more than three and typically as many as one hundred layers, can also result in new compositions of stem-surfaced web constructions having properties that may be different from those of the individual materials used. Either or both the first or second layers or any additional layer also may comprise two or more strata of at least two different materials, yielding multi-layer constructions with a wide array of composite characteristics.

Various materials also can be used to provide desired characteristics on either or both sides of the web. Some examples of these include adhesive surfaces, surfaces that can provide an abrasive or high friction surface, release surfaces that can provide a low friction surface, and active surfaces that provide a receptive surface for materials such as adhesives, coatings, or colorants to produce a durable image. Colorants can encompass a broad range of materials such as inks in water, or inks in organic solvents, or inks that are composed of 100% active material. These inks can be cured by such methods as exposure to ultraviolet (UV) light or electrostatic graphic imaging. Coatings can include any number of materials either as a 100% solids material, or dissolved or dispersed in any combination of water and organic solvents. One example would be a coating that permits the material to be printed by an ink jet printer.

Interlayer adhesion between the first and second layers (principal layers) or between any of the auxiliary layers where present may be enhanced by incorporating one or more reactive species into the layers to create a reactive tie layer at the interface or by incorporating into the construction separate layers that have affinities to both principal layers. Such reactive species enhance interlayer adhesion by reacting at the interface of the respective layers. As such, most of the reactive species may be in the bulk of the layer and thus not at the surface and useful for enhancing adhesion. Some polymers are marketed that contain small amounts of grafted reactive moieties. When properly matched, these materials effectively increase interlayer adhesion. Useful pairs include, for example, carboxylic acid/amine, maleic anhydride/amine, carboxylic acid and maleic anhydride/hydroxyl, maleate and maleic anhydride/double bond, carbodiimide/carboxylic acid, isocyanate/hydroxyl, amine/hydroxyl halide, ester/amine, ester/ester, ester/hydroxyl phenol, amide/ester, epoxide/hydroxyl or amine or carboxylic acid or maleic anhydride, oxazoline/carboxylic acid or phenol or maleic anhydride and lactam/amine or acid ionomer.

Reactive tie layers may be continuous or discontinuous and may be elastomeric or non-elastomeric. The selection of an appropriate tie layer will depend upon the functionality desired of that tie layer, and such selection will be within the competence of the skilled artisan. Generally, reactive tie layers comprise a multi-segmented graft polymer or block copolymer comprising molecular segments that have preferential affinity for the material of the first layer or that of the second layer. Useful tie layer materials include, for example, ethylene acrylic acid block copolymer for enhancing the adhesion of a layer of polyethylene to a layer of polyacrylic acid, ethylene vinyl alcohol block copolymer for enhancing the adhesion of a layer of polyethylene to a layer of polyvinyl alcohol, ethylene vinyl acetate block copolymer for enhancing the adhesion of a layer of polyethylene to a layer of polyvinyl acetate, ethylene methyl acrylate block copolymer for enhancing the adhesion of a layer of polyethylene to a layer of polymethylacrylate and polypropylene with grafted epoxy or maleic anhydride groups for enhancing the adhesion of a layer of polypropylene to a layer of polyurethane. Relative layer thickness influences the properties of the inventive elastic fastener construction. A thin layer of adhesive forming the outer layer of a stem and a stiff polymer forming a thick core of a stem yields a stem array that is more rigid than that having a thick layer of adhesive over a thin stiff core. It is important, however, that the overall thickness of the elastic layers (i.e., the first, continuous elastic layer along with any other elastic layers) is such that the overall construction exhibits elastic behavior.

Figure 1:
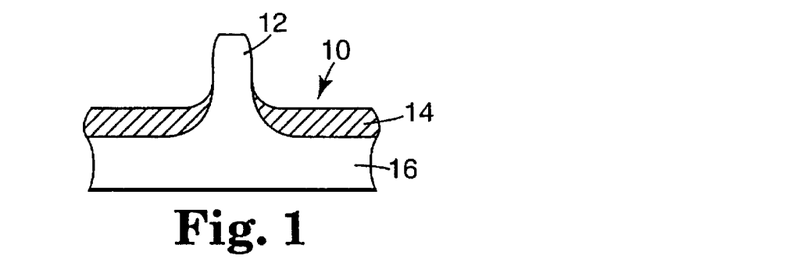
FIG. 1. A construction in which the first, elastic layer protrudes through the second layer to form the stem.

By controlling the thickness, viscosity, and processing conditions, numerous different constructions can be made. These constructions, along with the material selection, determine the performance of the final mechanical fastener hook. FIG. 1 shows a first construction of a sheet or web 10 having stems 12. This construction uses two layers of coextruded material, an upper layer (second layer) 14 and a continuous lower elastic layer (first layer) 16. In this construction, more lower layer material is used. The continuous lower elastic layer 16 forms the base of the sheet, and the core and the upper portion of the stems 12. The upper layer 14 forms a surface layer on the base of the sheet and around the lower portion of the stems. In alternative embodiments, a plurality of materials and a plurality of sublayers can form the respective upper and lower layers 14, 16.

Figure 2:
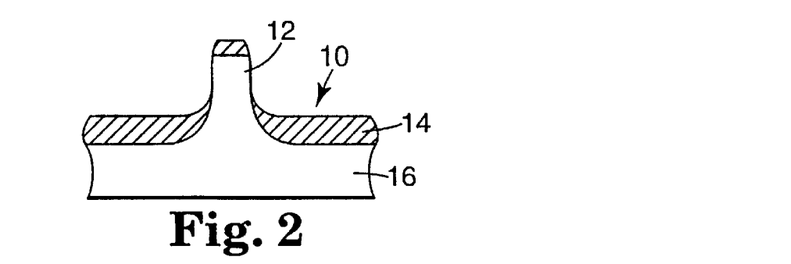
FIG. 2 is an embodiment like FIG. 1 except that the stem has a crown or tip made of the second layer material.

FIG. 2 shows a construction with more material in the upper layer 14 than in the construction of FIG. 1. The continuous lower elastic layer 16 again forms the base of the sheet 10 and the core of the stems 12. Here, the upper layer 14 forms a crown on a stem made from the lower layer 16. The upper layer 14 also forms a surface layer on the base of the sheet, including a sheath of material surrounding the base of the stem.

Figure 3:
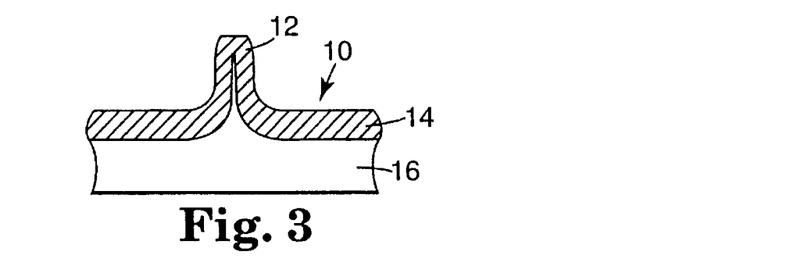
FIG. 3 is an embodiment in which the stem comprises a core of the first, elastic, layer material and an outer sheet or surface of the second layer material.

In FIG. 3, the continuous lower elastic layer 16 forms the base of the sheet 10 and a column of core material for the stems 12. The upper layer 14 forms the surface layer on the base and on the stems.

Figure 4:
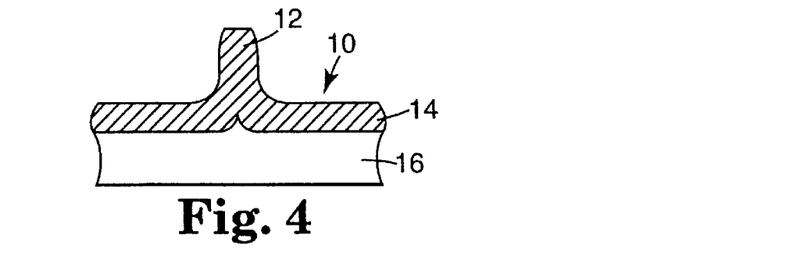
FIG. 4 shows an embodiment in which the stem comprises mostly the upper or second layer material and just a small portion of the first, elastic, layer material protrudes into the base of the stem.

In FIG. 4, the lower elastic layer 16 again forms the continuous base of the sheet 10 and a small portion of the stems 12. The upper layer 14 forms the surface layer on the elastic base and forms the majority of the stem material. The lower layer can form any portion of the stems to the point at which the upper layer forms the stem base sheet and the stems, and the lower layer is a continuous smooth sheet that does not form any part of the stems.

Figure 5:
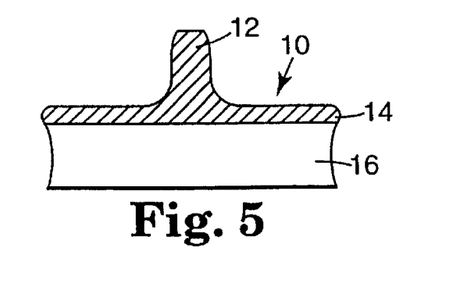
FIG. 5 is an embodiment in which the stem is made entirely of the second layer material.

FIG. 5 shows an embodiment similar to FIG. 4. In FIG. 5, the continuous elastic lower layer 16 forms the base of the sheet 10 and the upper layer 14 forms the surface layer on the base and forms the entirety of the stem material.

Figure 6:
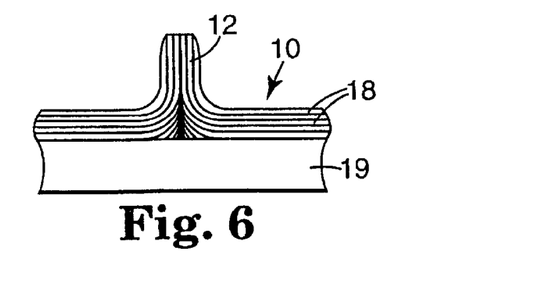
FIG. 6 shows an embodiment like FIG. 5, with the additional feature that the second layer comprises a plurality of layers.

FIG. 6 shows a stemmed sheet construction using a plurality of upper layers 18 of material and having a continuous lower elastic layer 19. Upper layers 18 could be as few as two layers or scores of different layers. These layers can comprise two or more different materials that can optionally be repeated in different layers and one or more of the layers can include a continuous or discontinuous reactive tie layer to increase interlayer bonding between any two adjacent layers. The elastic base of the sheet and the stems both are formed of many layers of material. This construction can result in a product with only one material (the uppermost layer) forming the surface layer on the base and forming the outer surface of the stems. Alternatively, as shown, the stems can have a plurality of layers exposed along the length of the stem from the bottom of the stem to the top.

The layers of the stemmed sheet, before stem formation, can be formed simultanteously or serially, and they can be joined together while either or both layers are molten, before the molten layer or layers have cooled. The layers also can be joined together by laminating them to each other and allowing the layers to cool simultaneously. Optionally, other material, like adhesives and printing can be applied to the web depending on the intended use and application for the web.

Serial forming can be accomplished by, for example, sequential extrusion, first extruding one layer and then extruding another layer. This can be performed with one or more dies. Alternatively, the layers can be formed in molds or by other known methods such as casting or calendering. Simultaneously forming can be accomplished by, for example coextrusion. A single multiple manifold die can be used or a feedblock which splits into multiple cavities to create multiple layers can be used.

Coextrusion can occur by passing different melt streams from different extruders into (1) a multiple slotted feed block and then into a single layer film die or (2) a multiple manifold die. In the multiple slotted feed block technique, at least two different materials are fed from different extruders into different slots (usually 2 to over 200) in a feed block. The individual streams are merged in the feed block and enter a die as a layered stack that flows out into layered sheets as the material leaves the die. The multiple manifold die combines the different molten streams from different extruders at the die dip. This method is usually limited to 2–3 layered films because of the increased complexity as the number of layers is increased. In both cases, the layered sheet leaving the die is passed between a nip formed by two rolls at least one of which has a tooled surfaced to create stems.

The layers of the fastener construction may also be laminated to one another under temperature and pressure conditions sufficient to achieve a desired bond strength using techniques well-known in the art. Generally, the layers are heated to a soft state and pressed together under pressure. Temperatures near the melting point of the respective polymers and pressures up to 20 KPa or more may be used to generate satisfactory interlayer adhesion. Alternatively, reactive tie layers, hot melt adhesives and pressure-sensitive adhesives may be used where high temperatures and pressures are undesirable.

The stem density depends on the application for the product. Densities ranging from 12–465 stem/cm$^2$ (81–3000 stems/in$^2$) are most useful. Many different stem geometries can be used. Stems can be straight, angled, or headed (capped). Capped stems can be shapped like mushrooms, golf tees, anchors, or nail heads. They can have an extruded profile. Straight stems can: be self mating; have a pressure-sensitive adhesive (PSA) outer layer; or be subsequently coated with a PSA. The stems can have any shape including, for example, rods, prisms, spheres, parallelepipeds, irregular angular shapes, and irregular curved shapes.

The stemmed web can also have a smooth surface with a coextruded layer on the smooth side of the web (the side opposite the stems) that combines the mechanical fastening function of the stemmed surface with another function.

In one embodiment of the invention a fastener construction may be designed having a second layer having stems formed of somewhat brittle thermoplastic material. In such an embodiment the thermoplastic material can form a thin skin layer on the continuous elastic base and can comprise the majority of the stem. This construction provides relatively stiff stems while preserving the overall elastic behavior of the construction, which comprises a thin, continuous top layer bearing the stems on a thick elastic layer. The elastic construction can be activated by stretching. The construction is subjected to sufficient initial elongation force to break or fracture the skin layer between adjacent stems such that the web may thereafter be stretched in between the stiff stems and may return substantially to its original state upon release of the stretching force. The stress required for each elongation will depend on the properties of the elastomeric core, such as modulus, thickness and degree of elongation. Tensile set also depends on the chemistry of the elastomer, and can range from near zero to 50 percent, and in most of the cases between 3 and 10 percent. Stretching ability of a coextruded stem web depends on the thickness ratio of the layers. Relatively inelastic, stiff polymers that would be suitable of the second layer bearing the stems include, for example, polycarbonate and polystyrene.

In another embodiment, the second layer bearing stems is made of an immiscible blend of melt processable polymer materials. As the immiscible blend is extended through a forming means, such as a die or calender, into a layer, one of the polymers forms a discontinuous phase within a continuous phase of the other polymer. The discontinuous phase polymer should be melt processable and sufficiently mixed with the continuous phase polymer so that the immiscible regions in the extruded product lie within the thickness of the second layer. The discontinuous phase forms (through for example the extrusion process) on a microscopic or molecular scale elongated regions (domains, strands or chains) that extend in the direction in the second layer, i.e., in the machine or down-web direction. Generally, the discontinuous polymer regions or domains should have a cross-sectional diameter in the formed layer of less than 250 micrometers, preferably less than 100 micrometers, most preferably less than 50 micrometers. Such a construction is anisotropic with regard to elongation.

The thermoplastic layer separates in multiple striations (by means of multiple fractures induced by stretching in the cross-web direction) within separate regions. That is, discrete regions of the thermoplastic (second) layer are separated when the construction is stretched in a direction that is cross-web or at right angles to the machine direction. As a result, the surface or stem layer breaks into multiple areas of narrow parallel (fracture) lines between regions where the surface layer is intact. In contrast, the thermoplastic (second) layer would separate in a more gross fashion when this type of construction is stretched in the down-web or machine direction. The surface (thermoplastic) layer would fracture into larger more randomly spaced regions. When the surface layer breaks into striations, the construction can be stretched to a greater degree and delamination of the surface layer around the fractures is not noticeable. However, when the surface layer fracture is confined to relatively fewer fractures that are separated by much more distance in the down-web direction, the construction would not be able to stretch as far and delamination would be more pronounced.

In another embodiment of the invention, the thermoplastic (second) layer is somewhat ductile. Thus, the thin top layer elongates permanently during "stretch activation" and folds over or wrinkles on a microscopic scale during relaxation. Somewhat ductile polymers that would be suitable include, for example, polyethylene and polypropylene.

The maximum thickness of the top (second) layer between the stems is important. The top layer should not be too thick to prevent stretch activation of the construction. Actual thickness of the top layer depends on the size of the stems desired and the force applied to activate the construction. Generally, thinner top layers are better. Typically, the top layer in the web before stems are formed should be less than 500 microns, preferably less than 250 microns and most preferably less than 125 microns.

Frequently, the minimum thickness of the top layer before stems are formed is important. The top layer before stems are formed should be thick enough to permit the formation of stems of a desired size and stiffness for a given application. If the material in the elastic layer provides sufficient support and the material in the top layer is sufficiently stiff, the top layer before stem formation can be quite thin because the stems do not need to be composed entirely of the material used in the top layer. Conversely, thicker top layers must be used if the stems must be composed entirely of the material of the top layer. The actual minimum top layer thickness before stem formation depends on the type of materials used in both principal layers and the application.

Figure 7:
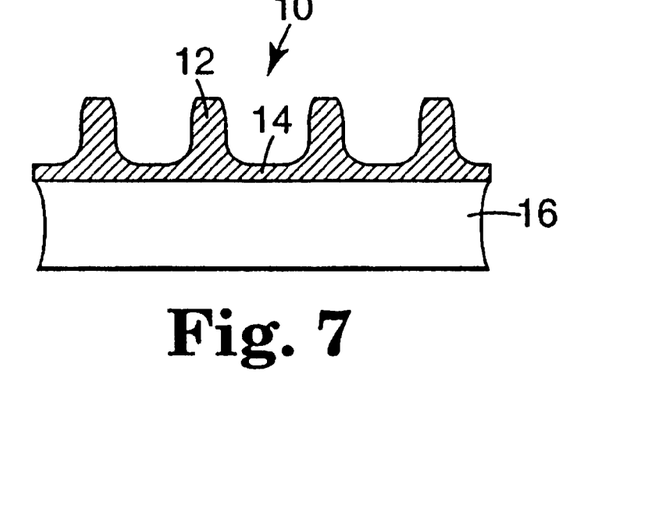
FIG. 7 depicts an embodiment of the inventive web with a plurality of stems, prior to being stretched activated.
Figure 8:
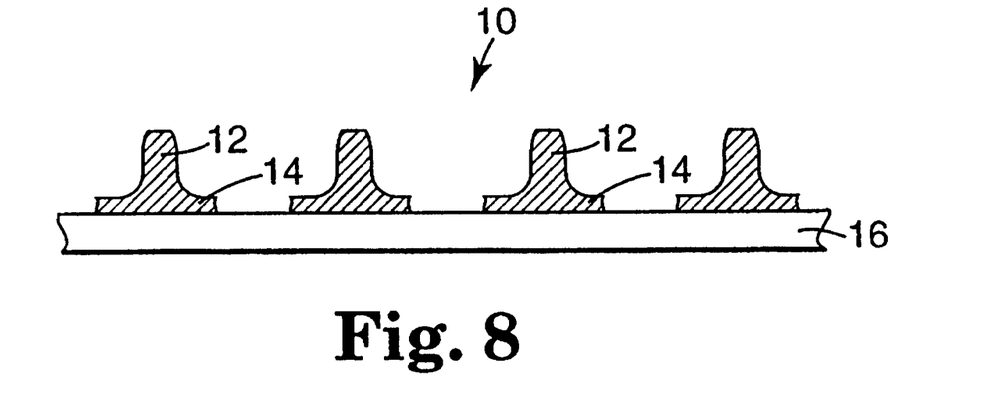
FIG. 8 depicts the same construction as FIG. 7 in the extended state after stretching and dislocation of the individual stems from each other.

These embodiments are illustrated by FIG. 7 and FIG. 8. FIG. 7 shows a pre-activated elastic web fastener 10 having stem portions 12 made substantially of the second material. The second layer 12, in addition to forming the stems, is present as a thin coating on top of the first continuous elastic layer 16 in between each stem. FIG. 8 illustrates the same construction in the extended state upon stretch activation. Here the web 10 is stretched such that the thin second layer 14 has dislocated between the stems by fracturing, allowing the elastic layer 16 to stretch freely. This construction, upon release of the stretching force, will return substantially to its original orientation, but the dislocations will remain such that the construction will again stretch to the state shown in FIG. 8.

Various additives may also be incorporated into one or more layers of the construction, such as fillers (to alter material firmness and flow properties) or antimicrobial agents or antioxidants (to affect aging properties). Microspheres, flame retardants, internal release agents, colorants, thermally conductive particles, and electrically conductive particles also can be used.

Hooks can be made by capping the stems to form mushroom heads as disclosed in U.S. Pat. No. 5,077,870. Also, hooks can be made using profile extrusion, forming a long rib on the web. The rib is then laterally sliced and then stretched to form a plurality of stems. Heads can be formed on the stems either before or after slicing. This is disclosed in U.S. Pat. No. 4,894,060.

The stems may also be shaped to provide directional hooking capability. Such directional hooks may be used to give directional stability to a hook and loop fastening construction by providing fastening in a selected direction and releasing capability in the opposite direction. The directional stems can be made by pressing the molten skin layer onto a tool having a plurality of holes that are angled in the same direction. The holes in the tool can be formed with a laser and can be drilled at various angles such as, for example, 45° degrees and 60° degrees, with respect to the top surface of the belt. The methodology of laser drilling of a thermoset tool is described in U.S. Pat. No. 5,792,411. These stems do not have to be capped to engage a loop surface. The resulting fastener surface permits the invention to be clinched tighter by pulling to release mechanical engagement and releasing to achieve mechanical engagement.

In one aspect, the loop layer can be electric if it incorporates elastic fibers that are aligned in one direction. When the construction is stretch-activated, cracks or fissures appearing in the hard (or inelastic second) layer that bears the stems become permeable to air and moisture. Since the elastic layer is already gas and moisture permeable, the entire construction is breathable after activation (ie. it is permeable to gasses and vapors).

The stemmed webs of this invention can be used in virtually any application as any other stemmed web, and find particular utility in the construction of compression wrap article or bandage that can be used in orthopedic applications. For example, elastic fasteners can be used as elastic wraps to secure cables, orthopedic articles or athletic protective devices. Medical wraps or bandages can be made to possess the strength, elasticity, and fastening properties required for a particular utility without the disadvantages associated with the use of cohesive and adhesive medical wraps and bandages.

This invention is further illustrated by the following examples that are not intended to limit the scope of the invention. In the examples, all parts, ratios and percentages are by weight unless otherwise indicated. The following test methods were used to characterize the articles in the examples:

Test Methods

Interlayer Adhesion

The interlayer adhesion between the materials of the thermoplastic layer and the materials of the elastic layer was measured on samples without stems made in a platen press. For each example, the adhesion between layers of these materials was measured by performing tensile, T-peel tests using a Model 1122 Instron apparatus, available from Instron Corporation, Canton, Mass. The width of the samples were 25 mm, and crosshead speed was 100 mm/minute.

Layer Thickness

The thickness of the layers in the samples were measured using a Model EG-233 Ono Sokki Digital Linear Gauge equipped with a Model ST-022 Gauge Stand, available from Ono Sokki Company, Ltd., Japan. An optical micrograph of a cross-section of a sample of film having stems on a surface was taken using an optical microscope with photographic capability, available from Leeds Precision Instruments, Minneapolis, Minn.

| Material | Description |
| --- | --- |
| DOWLEX ™ 3445 | Polypropylene, melt index 35 g/10 min., available from Dow Chemical Co., Midland, MI. |
| VECTOR ™ 4111 | Styrene-isoprene-stryene block co-polymer available from Exxon Chemical Co., Houston, TX. |
| STYRON ™ 615 | Polystyrene available from Dow Chemical Co., Midland, MI. |
| BYNEL ™ XB602 | Polypropylene with 1 wt % epoxy functional groups grafted thereon, available from DuPont Company, Wilmington, DE. |
| KRATON ™ FG-1901X | Styrene-ethylene/butylene-styrene block co-polymer with 1 wt % succinic anhydride, available from Shell Chemical Co., Houston, TX. |
| LOTADER ™ AX8840 | Copolymer of polyethylene and 8 wt. % glycidylmethacrylate, available from Elf Atochem Co., Philadelphia, PA |
| KRATON ™ G1657 | Styrene-ethylene/butylene-styrene block co-polymer, available from Shell Chemical Co., Houston, TX. |
| CD1010 | Triarylsulfoniumhexafluoroantimonate, available from Sartomer, Exton, Pennsylvania |
| ESTANE ™ 58661 | Polyurethane, tensile set of 3% when stretched 200%, shore hardness 85A, available from B. F. Goodrich, Cleveland, OH |
| TECOFLEX ™ CLC-60D | Polyurethane, shore hardness 70D, available from Thermedics Co., Spartanburg, SC. |
| DYPRO ™ 7825MZ | Polypropylene with a melt flow index of 35 available from Fina Oil & Chemical Co. Dallas, Texas. |
| G18 | Polystyrene with a melt flow index of 18 available from Huntsman Chemical Corp. Chesapeake, Virginia |
| Loop Material A | Non-woven sheet of polypropylene spun-bond and crimped loop material attached to a layer of KRATON ™ G1657 polymer which was attached to a thin layer of polypropylene and prepared according to U.S. Pat. No. 5,256,231. |
| Loop Material B | Woven sheet of Polyester Style 695738, available from Milliken and Company, Spartanburg, SC. |
| Loop Material C | Non-woven sheet consisting of parallel strands of SPANDEX fibers sandwiched between two layers of polypropylene spun-bond loop material, prepared by a means such that the SPANDEX fibers are in tension when the outer polypropylene spun bond material is applied to it. |

EXAMPLE 1

DOWLEX™ 3445 polypropylene, was fed into a single screw extruder having a diameter of about 32 mm, and L/D of 24/1, a screw speed of 15 rpm and a temperature profile that rose up to approximately 215° C. The thermoplastic material was passed through the extruder and continuously discharged at a pressure of at least 0.7 MPa through a heated neck tube and into one port in a three-layer adjustable vane feed block (Cloeren™ Model 86-120-398, available from Cloeren Co. and setup for two layers) that was mounted on a 25.4 cm wide film die (Cloeren™ EBR III 96–151 also available from Cloeren Co.). An elastic material, Vector 4111, was fed into a second single screw extruder having a diameter of about 64 mm, an L/D of 24/1, a screw speed of 5 rpm and a temperature profile that steadily increased to approximately 215° C. The elastic material was then continuously discharged at a pressure of at least about 1.4 MPa through a heated neck tube and into a second port in the three-layer feed block. The feed block and die were set at approximately 215° C. The die gap was set at approximately 0.5 mm. The two layer molten construction was discharged from the die and drop fed at about 1.5 m/min into a nip formed by two rolls having a nip pressure of about 0.2 KPa. The first roll had a tooled surface that was maintained at 55° C. and contained cavities with diameters of about 280 microns, depths in excess of about 2.5 mm and spacing of about 813 microns, resulting in a stem array having a stem density of about 140 stems/cm². The second roll had a smooth chrome-plated surface that was also maintained at 55° C. The polypropylene layer faced the tooled surface and the elastic layer faced the chrome surface. The resulting cast film was removed from the tooled surface to form a stem-surfaced film with rod-like stem projections, each having a diameter of approximately 300 microns and a height of about 700 microns, extending from the surface of the film. Caps were formed on the stems on part of the film by exposing the surface having stems to a roll heated to 138° C. The elastic side of the capped stem-surface film coated with LSE 300 acrylic based Transfer Pressure-Sensitive Adhesive, available from 3M, and laminated onto a sheet of Loop Material A.

Measurements were made on the film and a pressed sandwich made from similar materials, and the film was stretched at various lengths and observed. The adhesion between the hard and elastic layers was approximately by measuring Interlayer Adhesion on a pressed laminate made with similar materials that were pressed together in a Wabasha™ press that had been heated to 204° C. The interlayer adhesion for a laminate of these materials was 270 N/m. Elastic material was observed by optical microscopy to comprise the central part of the stems. The thickness of the hard layer and the elastic layer was measured to be about 20 and 100 microns ($\mu$m), respectively. Three samples of film were stretched either (1) to 400% beyond the sample's original length at one time, (2) 400% in 100% increments or (3) 50%. Upon stretching up to 400%, the thermoplastic layer between the stems permanently deformed in all three cases. Upon relaxing the film, the stem-surfaced film retracted about 80% of it's elongation such that about 20% of the extensions was a permanent elongation and the hard layer was observed to form a multitude of folds or ripples between the stems. Subsequent elongation and relaxation cycles resulted in only slight increases in permanent elongation. When the film was stretched and wrapped around onto itself, a mechanical bond was formed upon contact between the capped stem surface and the loop surface. No delamination between the layers of material was observed.

EXAMPLE 2 AND COMPARATIVE EXAMPLE 1

These examples illustrate the effect of increasing the thickness of the thermoplastic (second) layer on performance of the inventive web.

In Example 2 and Comparative Example 1, a film having a surface with a multiplicity of uncapped stems without loop material was made in a manner similar to that of Example 1 except that flow rate of the hard (thermoplastic) material was increased to result in an increased thickness in the second layer of 50 and 50 $\mu$m, respectively. The web of Example 2 was like FIG. 3, and the web of Comparative Example 1 was like FIG. 5.

For each example, the stem-surfaced film performance was observed during stretching. Example 2 was stretched up to about 20% before the thermoplastic film fractured. During the elongation, the hard layer deformed until fracture occurred at 20% elongation. The hard layer did not appear to delaminate from the elastic layer. In Comparative Example 1, the film broke with negligible stretching. The hard layer and the elastic layer exhibited some delamination and the thickness of the hard layer made with this material was too thick to permit any elastic material to flow into the stems and form a bond.

EXAMPLE 3

These examples illustrate the effect of increasing the thickness of a different hard layer on performance of the stem-surfaced film.

In Example 3, the film having stems without caps on its surface and without loop material on the other side was made in a manner similar to that of Example 1 except that the second layer material was Styron 615 polystyrene, and the flow rate of the hard material was increased to result in an increased thickness in the second layer to 20 $\mu$m. The extruder temperature was kept the same as in Example 1.

For each example, the stem-surfaced film performance was observed during stretching. Example 3 was stretched up to about 50% before the polystyrene film broke. During the elongation, microfractures formed in the polystyrene layer between the stems which separated with increased elongation.

EXAMPLES 4 AND 5

These examples illustrate the effect of using reactive tie layers and increasing the number of stems per unit area on performance of the stem-surfaced film.

In Examples 4 and 5, the film having a surface with uncapped stems without loop material was made in manner similar to that of Example 1 except reactive tie layers were present, and different materials and hole number densities in the tooled surface were used. In both Example 4 and 5, the hard material and the elastic material were Bynel™ XB602 polypropylene and Kraton™ FG-1901X copolymer, respectively. The tie layer was the reaction product of the epoxy functional groups in the hard layer and the succinic anhydride in the elastic layer. In Example 4 and 5, the tooled surface was changed to create a stem density of about 208 stems/cm$^2$ and 480 stems/cm$^2$.

For each example, the adhesion between layers of these materials was measured and the performance of the inventive web was observed during stretching. The interlayer adhesion was 1090 N/m. The stems were observed to consist of only hard material even though the layer thickness was 20 $\mu$m because the melt viscosity of the elastic material was much higher than that of the thermoplastic material and thus did not flow into the holes of the tooled surface. However, the hard and elastic layers were not observed to delaminate when the stem-surfaced films of both example 4 and 5 were stretched as in Example 1 even though there was no mechanical engagement between the layers. Increased stem number density, which would be expected to create stronger mechanical bonds, did not have any adverse effects on the stretch performance.

EXAMPLES 6–10

These examples illustrate the effect of using reactive layers and radiation crosslinking on performance of the stem-surfaced film.

In Examples 6–10, the two-layer films of thermoplastic and elastic layers were made with a Model 030H-15-LP Wabash Hot Press equipped with platen plates available from Wabash, MPI, Wabash, Ind. In Example 6 thermoplastic layers and elastic layers were individually made of thermoplastic material, Lotader™ AX8840, and elastic material Kraton™ G1657, respectively. The Lotader AX8840 polymer layer was formed by placing the material under a temperature of 204° C. and a pressure of 276 KPa for 1.5 minutes between the platten plates that were covered with polytetrafluoroethylene coated sheets. The Kraton™ G1657 layer was formed by placing the material under a temperature of 204° C. and a pressure of 827 kPa for 1.5 minutes between the platten plates that were covered with a polyimide based liner. The two layers were then pressed together under a temperature of 180° C. and slight contact pressure for 30 seconds. Immediately following heating, the two layer construction was rolled twice with a two pound roller. Example 7 was made as Example 6 except the elastic material was Kraton™ G1901. Example 8 was made as Example 7 except the two-layer film was (1) placed in an oven for 30 seconds that was preheated to 180° C. and (2) irradiated with ultraviolet light on a conveyor web line. The ultraviolet light curing system including a Model F600V curing system and EPIQ 6000 Irradiator, both available from Fusion UV Curing Systems, Gaithersburg, Md. The surface of the film was exposed to 2 J/cm² of radiation as measured by a UV Power Puck™, available from EIT, Sterling, Va. Example 9 was made as in Example 8 except the elastic layer contained 0.5 wt % $Ph_3SSbF_6$ catalyst. Example 10 was made like Example 9 except the amount of catalyst was 1.0 wt % and the two-layer film was prepared for 3 minutes before UV irradiation.

For each example, the adhesion between layers of these materials was measured and reported below.

TABLE 1

| Example | Interlayer Adhesion (N/m) |
| --- | --- |
| 6 | 270 |
| 7 | 305 |
| 8 | 1090 |
| 9 | 1140 |
| 10 | 2040 |

As seen in Table 1, the interlayer adhesion can be dramatically affected by the presence of actinic radiation sensitive catalysts. Increased interlayer adhesion decreases the need for interlayer adhesion via mechanical entanglement of the two principal layers, thus permitting stiffer stems to be made that do not contain any elastic material.

EXAMPLES 11 AND 12

These examples illustrates the effect of using a pair of materials that differ primarily in hardness on performance of the stem-surfaced film.

In Examples 11 and 12, the film having a surface bearing stems without loop material was made in a manner similar to that of Example 1 except the materials and some process conditions were different. The second layer material and the elastic material in both examples were TECOFLEX™ CLC-60D polyurethane and ESTANE™ 58661polyurethane, respectively. The flow rates were such that the hard layer and the elastic layer for Examples 11 and 12 were 20 and 100 μm and 10 and 100 μm, respectively.

Example 11 was stretched 20% before the second layer film broke. The permanent elongation was 10% upon the initial release. Example 12 could be stretched 30% without fracturing of the Tecoflex CLC-60D polurethane or delamination of the layers.

EXAMPLES 13 AND 14

Another method of making the inventive elastic stem-surfaced fastener;

Examples 13 and 14 were made similar to Example 1 except the layer containing loops was applied in a different manner. In Example 13, Loop Material B was passed between the nip between the tooled surface and the smooth surface with the molten two-layer film, both at about 1.5 m/min. An adhesive bonding layer was not needed because the molten film became sufficiently embedded into one woven fiber surface of the Loop Material b construction. Example 14 was made as Example 13 except the Vector 4111 elastic copolymer was absent from the process and Loop Material C was used instead of Material B.

The fastener constructions of both examples were stretch activated by elongating the web in three different directions, (1) down-web, (2)30° from down-web and (3) cross-web. Because of the anisotropic characteristics of the loop material used, the constructions were able to be stretched 150% in the first case, 40% in the second case and only 10% in the third case. Both examples could be wrapped around an object in the stretched condition and mechanically fastened.

EXAMPLE 15

The effect of self-mating stems on both sides was demonstrated.

The web of Example 15 was made in a manner similar to that of Example 1 except the thermoplastic second layer material was fed into both the first and third slot of the feed block, both surfaces of the nip were tooled with holes, capping was done at 180° C. and no loop material was used.

Each side of the resulting film was able to engage the other side without the use of loops after the film had been stretched at least 20%.

EXAMPLE 16

The effect of stem hook directionality on performance was demonstrated. Web having stems on a surface was made in a manner similar to Example 1 except that a tooled surface having a different pattern was used and the stems were not capped. The holes in the tooled surface were made at an angle to the surface of the tool rather than normal to the surface. Two samples were made, Sample A with holes in the tooled surface roll such that stems were formed in the vertical plane of the moving web and at an angle of 45 degrees back toward the die and Sample B at an angle of 60 degrees. The resulting stem-surfaced webs were laminated to Loop Material A. The resulting elastic structures were capable of being clinched, i.e. disengaging the mechanical fastening elements when stretched under tension and re-engaging them with increased binding pressure when the film was released.

EXAMPLE 17

The effect of anisotropic elasticity on performance was demonstrated.

A three layer film was prepared on a co-extrusion film line using 3 extruders. The A and C layers (first and second skin layers or outer layers) were extruded using 3.8 cm diameter single screw extrudes (24:1 L/D) manufactured by Davis-Standard Corp. Cedar Grove, N.J. having barrel zone temperature profiles of 177° C.–204° C.–218° C.–246° C. and screw speeds of 23 rpm. The compositions of the A layer and the B layer were the same and considered of a blend of DYPRO™ 7825MZ polypropylene and G18 polystyrene in a weight ratio of 25:75. The B layer (elastomeric core) was extruded with a 6.35 cm diameter single screw extruder (24:1 L/D) manufacturing by Davis-Standard Corp. Cedar Grove, N.J. using a barrel zone temperature profile of 177° C.–204° C.–218° C.–246° C. and a screw speed of 30 rpm. KRATON™ G1657 copolymer was used for the B layer. The A, B, and C polymer streams were combined in a Cloeren™ ABC feed back (Cloeren Co., Orange, Tex.) and then extruded through a conventional coat hanger die. The feedblock and die were maintained at a temperature of 260° C. The 3 layer film was extruded into a nip formed with a chrome roll and a temperature controlled tooled surface with the C layer being in contact with the tooled surface. The tooled surface contained stem forming cavities at a density of 388/cm². The chrome roll was maintained at a temperature of 7° C. and the tooled surface was maintained at a temperature of 66° C. The 3 layer film was stripped from the tooled surface and wound into a roll. The resulting film had a base film thickness of 163 microns with upstanding stems formed from the C layer projecting from the base film having heights of about 550 microns and diameters of about 226 microns (measured about 150 microns above the base film face). The film was then fed through a 406 micron gap between an upper (133° C.) calender roll and lower (43° C.) backup roll such that the upper roll would contact the distal ends of the stems and heat them to a temperature at which they readily deform under mechanical pressure, resulting in generally uniform disc shaped heads having diameters of 330 microns.

Samples of the resulting film were cut into strips approximately 3 cm long and 2.5 cm wide. Sample A had its long dimension in the machine direction and Sample B and its long dimension in the cross-web direction. Both were stretched in the long dimension to activate the construction. The stem-surface of Sample A fractured into a single jagged line across the strip. Further stretching resulted in a second and a third fracture across the strip between regions of unbroken surface measuring between 1 and 3 cm long. Delamination was observed between the thermoplastic stem surface layer and the elastic layer. The surface of Sample B having stems fractured into several regions of striations across the strip. Delamination was not observed.

What is claimed is:

1. A web of material having two sides and having a plurality of stems (12) extending from at least one of the two sides, the web characterized by having at least two layers comprising:
   (a) a first layer (16) comprising elastomeric material having a first side and a second side; and
   (b) a continuous second layer (14) of thermoplastic material having a first side that faces the first side of the first layer (16) and a second side from which said plurality of stems (12) extend, the thickness of the second layer between the stems being less than 500 μm;
   wherein said web (10) may be elongated from an initial state in at least one direction when subjected to a tensile stress and said first layer substantially returns to its initial state upon the removal of the stress and said second layer permanently deforms between at least two adjacent stems.

2. The web of claim 1 wherein said elastomeric material is selected from the group consisting of natural and synthetic rubbers, styrene block copolymers containing isoprene, butadiene, or ethylene(butylene) blocks, metallocene-catalyzed polyolefins, polyurethanes and polydiorganosiloxanes.

3. The web of claim 1 wherein said thermoplastic material is selected from the group consisting of: polyolefins, polystyrenes, polycarbonates, polymethacrylate, ethylene vinyl acetate copolymers, acrylate modified ethylene vinyl acetate polymers, and ethylene acrylic acid copolymers.

4. The web of claim 1 wherein said first and second layers are adhered to one another through a reactive tie layer selected from the group consisting of (1) the reaction product of reactive functionalities in the first and second layers that react where the first side of the first layer contacts the first side of the second layer, and (2) a polymer material composing segments that have preferential affinity for the material of the first layer or material of the second layer.

5. The web of claim 1 wherein one or more of the stems have caps.

6. The web of claim 1 wherein one or more of said stems are coated with an adhesive material.

7. The web of claim 6 wherein said adhesive material comprises a pressure sensitive adhesive.

8. The web of claim 1 wherein said stems are uncapped and have an outer surface that is self-adhering.

9. The web of claim 1 wherein one or more of the stems are shaped to provide directional hooking capability.

10. The web of claim 1 wherein said second layer comprises a blend of at least two immiscible melt processable polymer materials.

11. The web of claim 1 further comprising at least one additional layer disposed on the outer surface of at least one of the layers, wherein said additional layer has a surface having a multiplicity of features which mechanically interlock with the stems on the second layer to perform a fastening or closure function.

12. The web of claim 1 wherein at least one layer is composed of at least two strata of at least two different materials.

13. The web of claim 1 wherein said permanent deformation is a fracture.

* * * * *

UNITED STATES PATENT AND TRADEMARK OFFICE
CERTIFICATE OF CORRECTION

PATENT NO.    : 6,489,003 B1
DATED         : December 3, 2002
INVENTOR(S)   : Leon Levitt

It is certified that error appears in the above-identified patent and that said Letters Patent is hereby corrected as shown below:

Column 6,
Line 46, delete "dip" and insert in place thereof -- lip --.

Column 13,
Line 64, delete "b" and insert in place thereof -- B --.

Signed and Sealed this

Twenty-ninth Day of April, 2003

JAMES E. ROGAN
*Director of the United States Patent and Trademark Office*